US010223362B2

(12) United States Patent
Puccio, III

(10) Patent No.: US 10,223,362 B2
(45) Date of Patent: Mar. 5, 2019

(54) METHODS AND SYSTEMS FOR CONVERTING BUSINESS TO BUSINESS DATA TO A CANONICAL FORMAT

(71) Applicant: Peter J. Puccio, III, Portland, OR (US)

(72) Inventor: Peter J. Puccio, III, Portland, OR (US)

(73) Assignee: International Electronic Business III, Inc., Portland, OR (US)

( * ) Notice: Subject to any disclaimer, the term of this patent is extended or adjusted under 35 U.S.C. 154(b) by 246 days.

(21) Appl. No.: 15/087,910

(22) Filed: Mar. 31, 2016

(65) Prior Publication Data
US 2017/0286438 A1 Oct. 5, 2017

(51) Int. Cl.
*G06F 17/30* (2006.01)
*G06Q 10/06* (2012.01)

(52) U.S. Cl.
CPC ..... *G06F 17/30076* (2013.01); *G06Q 10/063* (2013.01); *Y04S 10/54* (2013.01)

(58) Field of Classification Search
CPC ......... G06F 17/30076; G06F 17/30563; G06F 17/30569; G06Q 10/063; G16H 10/60
See application file for complete search history.

(56) References Cited

U.S. PATENT DOCUMENTS

| | | | | |
|---|---|---|---|---|
| 2002/0103831 A1* | 8/2002 | Iyer | .................. | G06F 17/24 715/234 |
| 2003/0225789 A1* | 12/2003 | Bussler | ............. | G06F 17/30569 |
| 2004/0068526 A1* | 4/2004 | Singh | ................ | G06F 17/30569 |
| 2006/0167909 A1* | 7/2006 | Mendis | ............. | G06F 17/30569 |
| 2013/0173719 A1* | 7/2013 | Ahmed | .................. | H04L 67/12 709/206 |
| 2014/0036317 A1* | 2/2014 | Krig | ..................... | G06F 3/0638 358/3.24 |
| 2014/0372428 A1* | 12/2014 | Mathis | ............. | G06F 17/30569 707/736 |
| 2016/0048655 A1* | 2/2016 | Maitra | ................ | G06F 19/3456 705/3 |
| 2016/0070755 A1* | 3/2016 | Kramer | ............ | G06F 17/30477 707/760 |

* cited by examiner

*Primary Examiner* — Noosha Arjomandi
(74) *Attorney, Agent, or Firm* — Mohr Intellectual Property Law Solutions, P.C.

(57) ABSTRACT

Systems and methods for converting business to business data in standard formats into a canonical XML format. Translation is facilitated by the use of pattern files, that provide mappings from various data provider's unique data fields and arrangements to a canonical format that can be adapted to a user's requirements. Pattern files are assigned each to a data provider. If no pattern file is assigned, a new file is created and customized from a library of default pattern files. In some examples, the system includes multiple translation engines, each of which is geared to a particular B2B format. In some further examples, system and methods can be reversed so as to supply B2B standard data to a data provider from the user's canonical formatted data.

18 Claims, 5 Drawing Sheets

METHODS AND SYSTEMS FOR CONVERTING BUSINESS TO BUSINESS DATA TO A CANONICAL FORMAT

BACKGROUND

The present disclosure relates generally to data transfer methods between businesses. In particular, methods and systems for receiving variety of different business to business (B2B) standard data formats and converting them to a structured canonical XML format that is specific to a data user are described.

B2B data transfer solutions resent companies with great advantages. Time savings in data entry, reduction in mistakes, reduced continuing personnel costs, and opportunities for automation with existing back end business systems, to name some advantages, all make B2B data transfer between parties attractive. However, known methods and systems for transmitting B2B data between parties are not entirely satisfactory for the range of applications in which they are employed. For example, existing B2B integration is complex and expensive undertaking. The necessary software alone can cost hundreds of thousands of dollars. Employee costs for an implementation team with appropriate integration expertise can reach into the tens of millions of dollars in some cases, as title time to on-board a single B2B partner can be months. Consequently, the approximately 28 million small to medium businesses in the US alone are very often unable to integrate with existing B2B transaction systems due to the prohibitive costs.

Furthermore, B2B standards based translation is complicated by the existence of too many "standards," which expands greatly to the breadth and orientation of all B2B software. A single company that does business with several partners who use B2B solutions may find that each partner has settled upon a different B2B standard, which multiplies cost and complexity if the single company want to utilize B2B transfers with each partner. By definition there should only be one standard, or it is not a standard. Furthermore, multiple standard are greatly redundant, as each standard is broad enough to enable transactions for anything any company on earth might process.

Thus, there exists a need for methods and systems for converting from various B2B standards that improve upon and advance the design of known methods and systems of B2B transfer and interchange. Examples of new and useful methods for converting B2B format to a canonical format relevant to the needs existing in the field are discussed below.

SUMMARY

The present disclosure is directed to systems and methods for converting business to business data in standard formats into a canonical XML format. Translation is facilitated by the use of pattern files, that provide mappings from various data provider's unique data fields and arrangements to a canonical format that can be adapted to a user's requirements. Pattern files are assigned each to a data provider. If no pattern file is assigned, a new file is created and customized from a library of default pattern files. In some examples, the system includes multiple translation engines, each of which is geared to a particular B2B format. In some further examples, system and methods can be reversed so as to supply B2B standard data to a data provider from the user's canonical formatted data.

DETAILED DESCRIPTION

Figure 1:
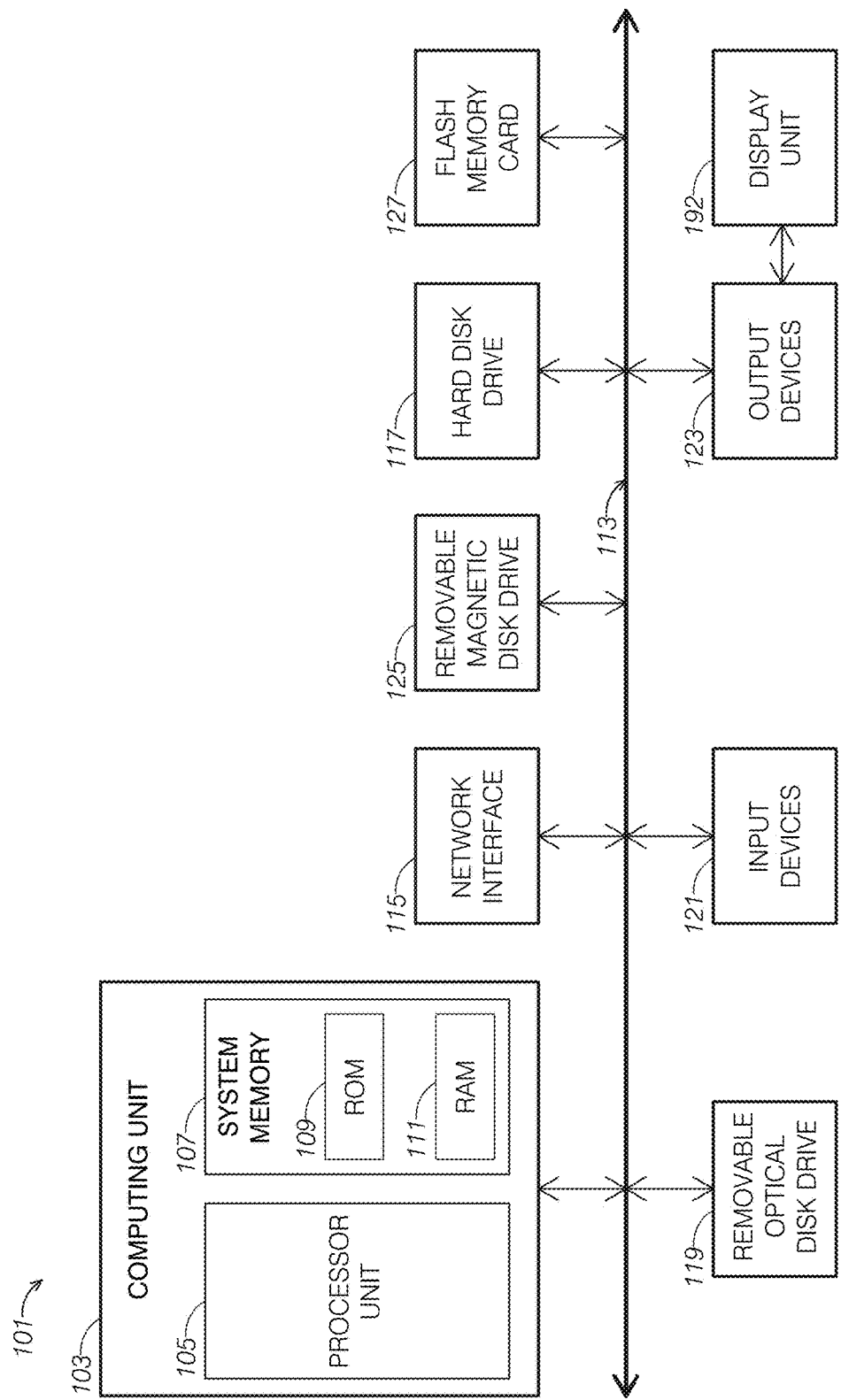
FIG. 1 shows a schematic view of an example of a programmable computing device.

The disclosed systems and methods for converting B2B data will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the follow in detailed description, examples of various systems and methods for exchanging B2B data are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The disclosed systems and methods provide for the interconversion of data formatted in any one of the existing or yet to be developed standard B2B structures into a canonical, preferably XML-formatted structure, which can be formatted in an ad hoc structure that is tailored to the specific needs of the data recipient and is useable for any number purposes, including the conversion and import into business applications. As the systems and methods are bi-directional, canonical formatted data can likewise be converted to a B2B standard format, for use various business partners.

With reference to FIGS. 1-5, a system and associated methods for converting business to business (B2B) data into a structured canonical format, system 300 and methods 400 and 500, will now be described. System 300 functions to convert B2B formatted data from a variety of providers into a canonical format that is useable by the target recipient, and likewise to take canonical formatted data and convert it to B2B structured data useable by a target data provider. Methods 400 and 500 describe the steps of these conversions, and are carried out by system 300. Computer 101 and mobile device 200, disclosed in FIGS. 1 and 2, can execute software implementing system 300 and methods 400 and 500. The reader will appreciate from the figures and description below that system 300 addresses shortcomings of conventional methods of B2B integration and interchange.

For example, system 300 and associated methods 400 and 500 provide a single, extensible system and methods for converting data from a variety of B2B standards to a canonical format customized to a user of system 300, thereby greatly reducing implementation costs to an implementing business. Previously, a number of applications run by a business for back end purposes would all need to be configured to receive whatever B2B standards were implemented by partners of the business. This could require lengthy multiple customizations. System 300 enables multiple B2B formats to be converted to a single canonical format, so that the back end business systems would only need to understand the canonical format. Further, by using pattern files to create mappings between specific B2B formats to the user's canonical format, B2B providers can be quickly, efficiently, and inexpensively on-boarded, with new B2B providers easily added and integrated into the user's back end systems and workflow.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Accordingly, FIG. 1 shows one illustrative example of a computer, computer 101, which can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, amid a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick) a scanner, a camera, or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115 is also sometimes referred to as a network adapter or network interface card (NIC). Network interface 115 translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according to the various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile and Windows 8), or Android operating systems.

Figure 2:
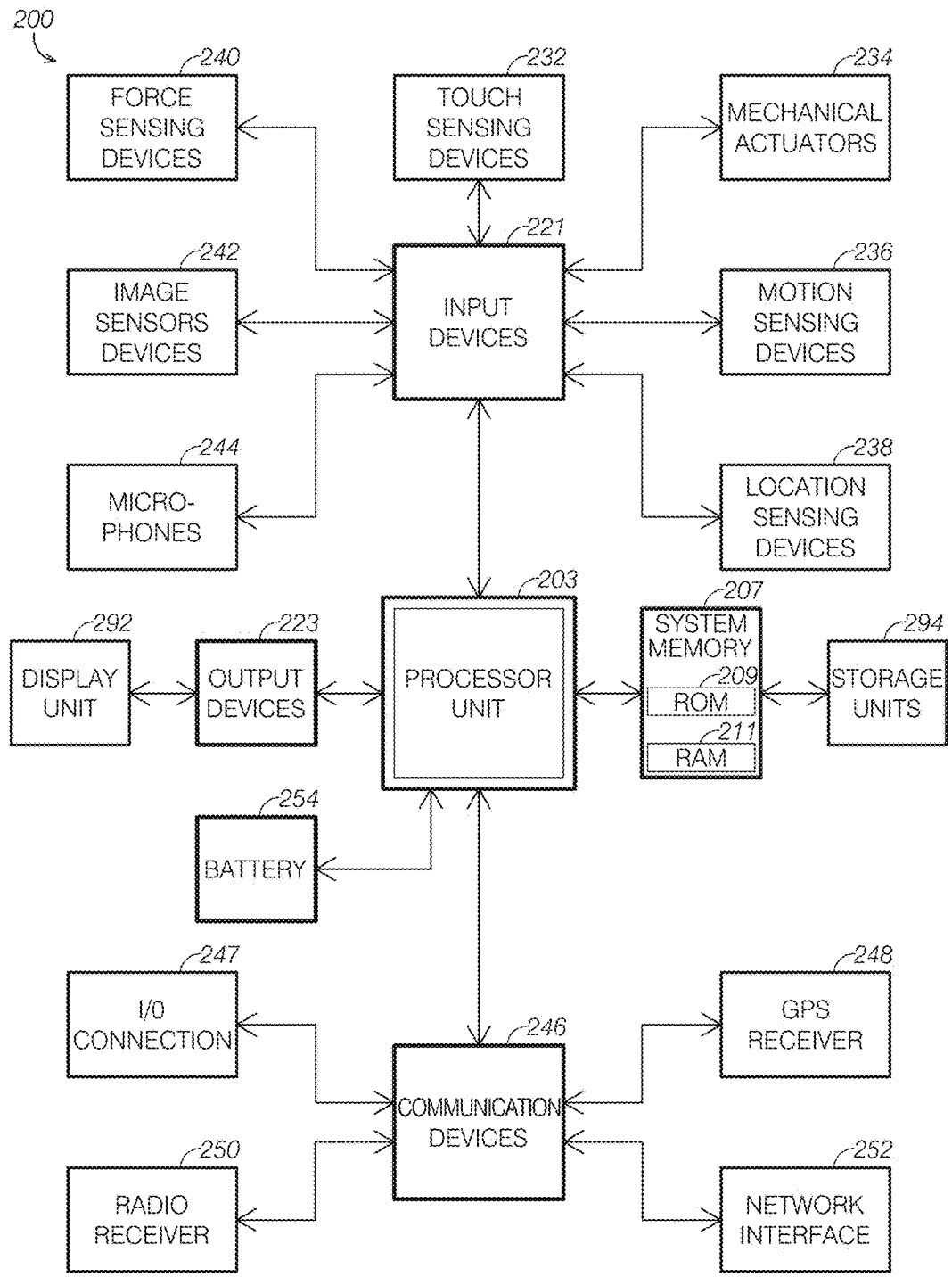
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such as iOS, Symbian, Windows-based (including Windows Mobile and Windows 8), or Android operating systems, or alternatively to special purpose operating system, such as those used for limited purpose appliance type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211, etc. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data front the outside world into mobile device 200. As shown, input devices 221 may correspond to both data entry mechanisms and data capture mechanisms. In particular, input devices 221 may include the following: touch sensing devices 232 such as touch screens, touch pads and touch sensing surfaces; mechanical actuators 234 such as button or wheels or hold switches; motion sensing devices 236 such as accelerometers; location detecting devices 238 such as global positioning satellite receivers, WiFi based location detection functionality, or cellular radio based location detection functionality; force sensing devices 240 such as force sensitive displays and housings; image sensors 242; and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

System 300 for exchanging business to business data includes at least one translation engine 304 capable of translating at least one business to business data standard, and at least one pattern file 306 useable by the at least one translation engine 304. Pattern file 306 includes instructions for translating data 302 in the least one B2B data standard to a canonical format. The at least one translation engine 304 receives data 302 from a data provider 301, loads the at least one pattern file 306, and translates the data 302 into canonical formatted data 308 in accordance with the instructions in the pattern file. In other examples, system 300 may additionally engage a canonical conversion program 312 to convert the canonical formatted data 308 into an application import/export data format 314 for further use by corporate applications 316.

Figure 3:
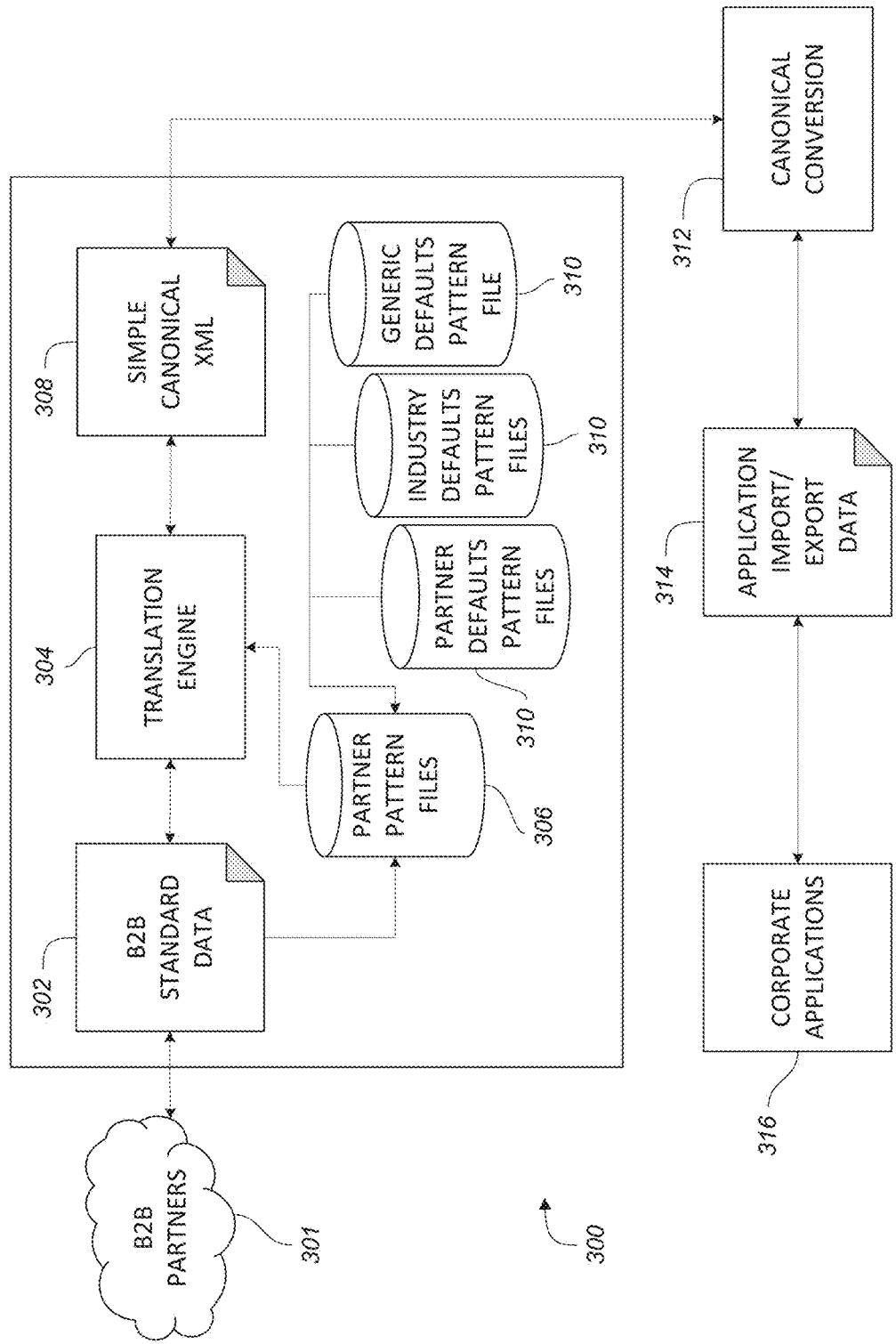
FIG. 3 is a diagram view of an example of a system for converting B2B formatted data into a canonical format.

As can be seen in FIG. 3, data 302 is received from a data provider 301. Data provider 301 can be a business to business partner with other businesses, needing to exchange business-related data and transactions. Data provider 301 could also comprise an application intending to exchange B2B data with another application or data recipient, such as a business to business partner. Data provider 301 could further comprise a file or other data repository that is read by system 300. Thus, data provider 301 is any entity, application, or other device or facility that possesses and can transmit B2B formatted data 302.

Data 302, as mentioned above, is received by translation engine 304. Data 302 is formatted in a standard B2B format, of which there may be a variety of types. Consequently, there may be multiple translation engines 304, with each translation engine 304 being directed to and programmed to understand a particular B2B standard format. Translation engine 304 may also be designed to support multiple B2B standards, and either automatically detect or be signaled as to which B2B standard with which data 302 is implemented. Still other possible implementations could employ a separate detection program or mechanism that determines the B2B standard with which data 302 is formatted, and select and/or launch the appropriate corresponding translation engine 304. Translation engine 304 can be implemented using any programming technique now known or later developed in the relevant art, including implementations as a stand-alone process, a series of processes, or a module that is part of a larger monolithic program.

Translation engine 304 is designed to read in data 302, analyze it in accordance with the relevant B2B data standard, and convert data 302 into canonical formatted data 308. As the configuration of both B2B standard structured data 302 and canonical formatted data 308 will necessarily vary depending on data provider 301 as well as the target recipient of data 302, translation engine 304 first loads pattern file 306, which includes instructions for translation engine 304 for the exact locations to retrieve and place various fields and categories of data in data 302 into canonical formatted data 308. As will be subsequently discussed in the disclosures on the associated methods, translation engine 304 can work bidirectionally, either translating and converting data 302 into canonical formatted data 308, or canonical formatted data 308 into B2B standard structured data 302 suitable for an intended data provider 301. In either case, pattern file 306 is used to instruct translation engine 304 in the proper mapping of data fields between canonical and B2B formats. Translation engine may use any algorithm for parsing data files currently known in the relevant art or later developed. For example, simple data interchange formats such as comma separated values (CSV) have many commercially available packages capable of parsing the CSV format into separate data fields, which could then be used to feed into a canonical XML formatted file by using pattern file 306 to instruct translation engine 304 where each CSV field maps into the canonical format.

Canonical formatted data 308, as mentioned above, is typically implemented as a canonical format using extensible markup language (XML) to allow for an arbitrarily structured format that can be specifically tailored to the data requirements of an intended recipient for data 302, as well as a format that is both human and machine readable. Due to the ability of a canonical XML format to provide arbitrary structures, pattern file 306 serves to specify the particular format desired by the intended recipient for data 302 that sill be output by translation engine 304.

Pattern file 306, as described above, serves to provide instructions to translation engine 304 for how to map the various fields in B2B standard structured data 302 received from a data provider 301 to canonical formatted data 308, in addition to instructing translation engine 304 in the actual format and structure of canonical formatted data 308 as required by the intended recipient of data 302. The structure and specific contents of pattern file 306 will depend upon the specific implementation of translation engine 304, and may itself be provided in a standard format such as XML, or any other format or file type that is now known or later developed.

As pattern file 306 provides instructions to translation engine 304 for creating a canonical XML file that is specific for an intended recipient of data 302, and the intended recipient of data 302 may receive data 302 from a number of different data providers 301, the particular data fields of B2B standard structured data 302 will vary depending upon data provider 301. Consequently, there is preferably a plurality of pattern tiles 306, with one each assigned to a particular data provider 301 with whom the intended recipient of data 302 needs to transfer B2B data. Part of the process of translation engine 304 receiving data 302 includes identifying data provider 301 and loading pattern file 306 that is assigned to the particular data provider 301 supplying data 302. This is shown in steps 404 and 406 in FIG. 4, which will be discussed in greater detail below. Furthermore, if system 300 is implemented to be used with multiple recipients of data 302 in addition to multiple data providers 301, there may exist a pattern file 306 for each specific combination of data provider 301 and associated recipient. Where there are multiple pattern files 306, the multiple pattern files 306 could instead be implemented as a database that provides relevant translation information on the basis of identified data providers 301 and/or recipients of data 302.

In cases where there is no existing pattern file 306 assigned to a given data provider 301, a default pattern file 310 may be loaded to serve as a starting point for creating a pattern file 306 that is specific to data provider 301. As can be seen in FIG. 3, default pattern files 310 may include partner-specific default pattern files, industry-specific default pattern files, and generic default pattern files. Which of these three types of default pattern files 310 may be selected depends upon the nature of data provider 301. Where data provider 301 is known to system 300 but has not previously exchanged data with the target recipient, a partner-specific default pattern file corresponding to data provider 301 is loaded. Such files will preferably have pre-established mappings of which particular data fields in data 302 are used by the partner, in addition to the location of the particular data fields. If, however, data provider 301 is unknown to system 300 but the particular industry of data provider 301 is known, an industry-specific default pattern file may be loaded. Industry-specific pattern files will preferably be set up to locate and map data commonly used by the associated industry from the typical locations such data is found for the associated industry. Finally, if data provider 301 is both unknown to system 300 and is in an unknown industry, a generic default pattern file can be loaded. Generic files can specify commonly used data fields and locations that tend to be implemented by most businesses. Generic files may also be derived from the particular B2B standard structure being used, where a particular B2B format is commonly used for certain types of data, and such data is typically used in a consistent location.

Once a suitable default pattern file 310 is selected and loaded, it can be customized as necessary with the particular canonical XML format mappings required by the intended target recipient of data 302. These mappings can either be preprogrammed into translation engine 304 (where system 300 and/or translation engine 304 is dedicated to a particular target recipient), or derived from a preexisting pattern file 306 that has been previously assigned to another data provider 301 for exchanging data 302 with the intended target recipient. Where default pattern file 310 is obtained from a partner-specific default pattern file, customization with the required canonical XML format mappings for the target recipient may be the extent of customizations needed. Conversely, where an industry-specific or generic default pattern file is used, in addition to canonical XML mappings, the default pattern file may also need customizations to B2B standard fields as used by the particular data provider 301. Such customizations can either be handled automatically, if common data and locations can be determined, by manual mapping, or by a combination of both, e.g. manual mapping with preliminary automatic assistance. Any suitable algorithm now known or later developed for performing automatic mapping and customization may be used.

Following selection and customization of default pattern file 310, the customized pattern file is assigned to data provider 301, to become a new pattern file 306 for use with future transactions between data provider 301 and the target recipient.

Finally, system 300 can optionally be equipped with a canonical conversion program 312, which receives canonical formatted data 308 and converts it further into an application import/export format 314 that is suitable for use with an intended corporate application 316. Such formats 314 may include the file formats for well-known programs like the Microsoft® Office suite of programs, as well as any other business application for which a data format can be obtained. Canonical conversion program 312 is bi-directional in nature, allowing both conversion from canonical formatted data 308 to an application import/export format 314, and from application import/export format 314 to canonical formatted data 308, for feeding back into system 300 and ultimately translation into B2B formatted data 302. Canonical conversion program 312 can be implemented in any suitable fashion now known or later developed in the relevant art, including as a standalone program or process, or as part of or a module of a larger program.

Figure 4:
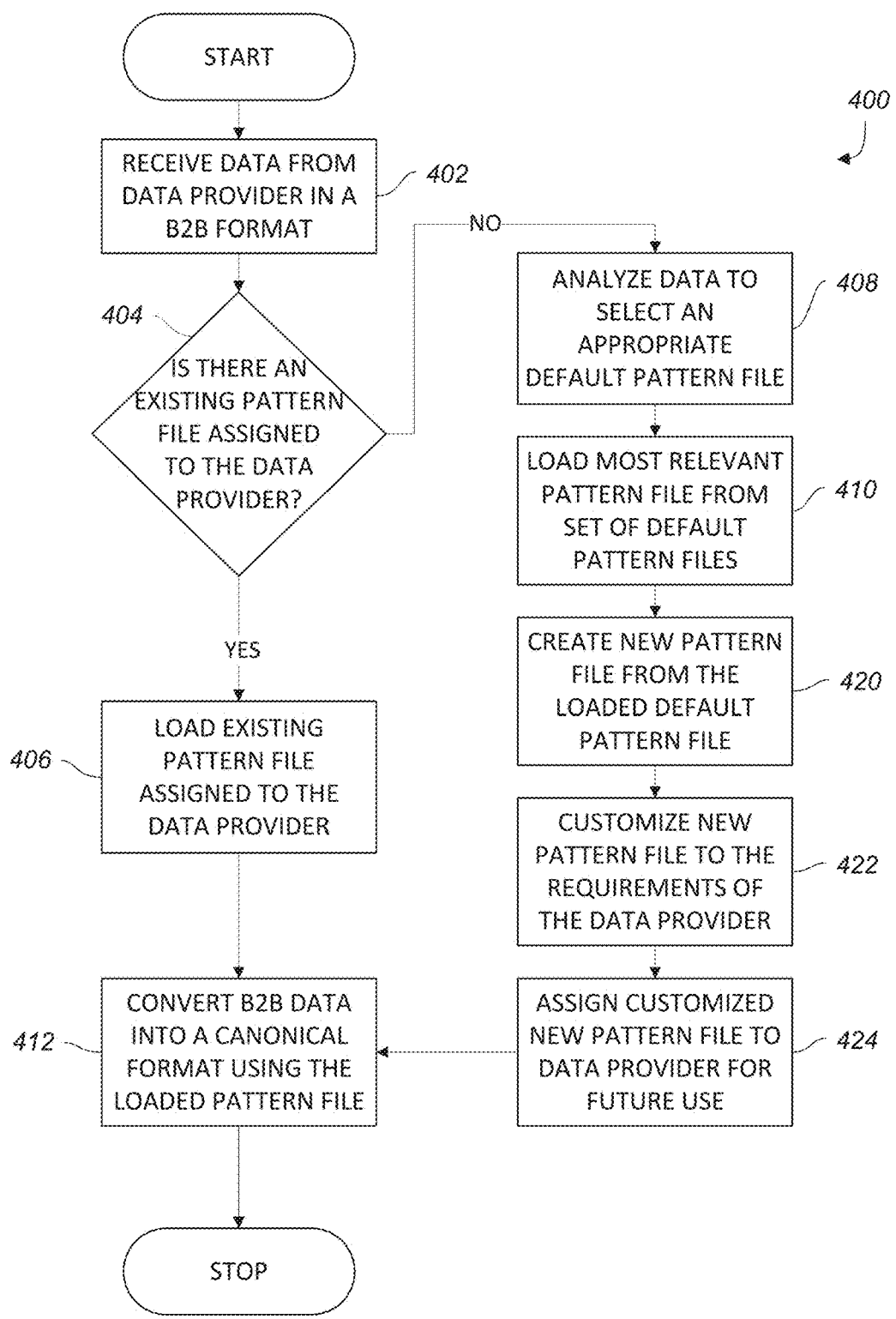
FIG. 4 is a flowchart of a method that is performed by the system shown in FIG. 3 depicting the steps for converting B2B formatted data into a canonical format.

Turning attention to FIG. 4, a method 400 for converting B2B data into a canonical format will now be described. Method 400 is embodied in the functionality of system 300, much of which was described above. System 300 carries out method 400. Thus, for the sake of brevity, each feature of the various steps in method 400 will not be redundantly explained. Rather, key details of method 400 that were not described in connection with system 300 will be described in detail. The reader should reference the foregoing description of system 300, as various components of system 300 are referenced below in the context of the various steps of method 400.

As can be seen in FIG. 4, method 400 includes a first step 402 of receiving B2B standard formatted data 302 by translation engine 304. Next, an appropriate pattern file 306 is selected in step 404. The selected pattern file is loaded in step 406, and used in step 412 to translate the data 302 to canonical formatted data 308.

Step 404 includes the preliminary determination of whether there is an existing pattern file 306 that is assigned to data provider 301, who supplied data 302 in step 402. This determination can be performed on the basis of a user of method 400 informing system 300 of the identity of data provider 301, by such information being supplied as part of data 302, by such information being separately provided and transmitted by data provider 301 to system 300, or by any other suitable means of informing system 300 of the identity of data provider 301. Supplied with the identity of data provider 301, system 300 can determine whether there is an existing assigned pattern file 306. If an assigned pattern file 306 exists, step 404 moves immediately to step 406, where the assigned pattern file 306 is loaded by the translation engine 304. Step 412 is moved to next, where data 302 is converted to canonical formatted data 308.

Should the result of step 404 be that an assigned pattern file 306 does not exist, step 404 proceeds to step 408, where an analysis of data 302 is performed, preferably with at least a knowledge of the identity of data provider 301, obtained as described in the context of step 404. In step 408, an appropriate default pattern file 310 is selected. The analysis of data 302 and selection of an appropriate default pattern file 310 is described above in connection with the associated description of default pattern file 310. Following analysis step 408, the selected default pattern file 310, e.g. a partner-specific default pattern file, industry-specific default pattern file, or generic default pattern file, is loaded in step 410, and a new pattern file 306 is created in step 420.

Step 422 entails customizing the pattern file 306 newly created in step 420 to match the requirements of data provider 301 and the target recipient of data 302. Such customization steps are described above in connection with default pattern file 310. Following customization, the customized pattern file 306 is assigned to the data provider 301 in step 424. Step 424 in turn proceeds to step 412, where conversion of data 302 to canonical formatted data 308 is carried out.

Figure 5:
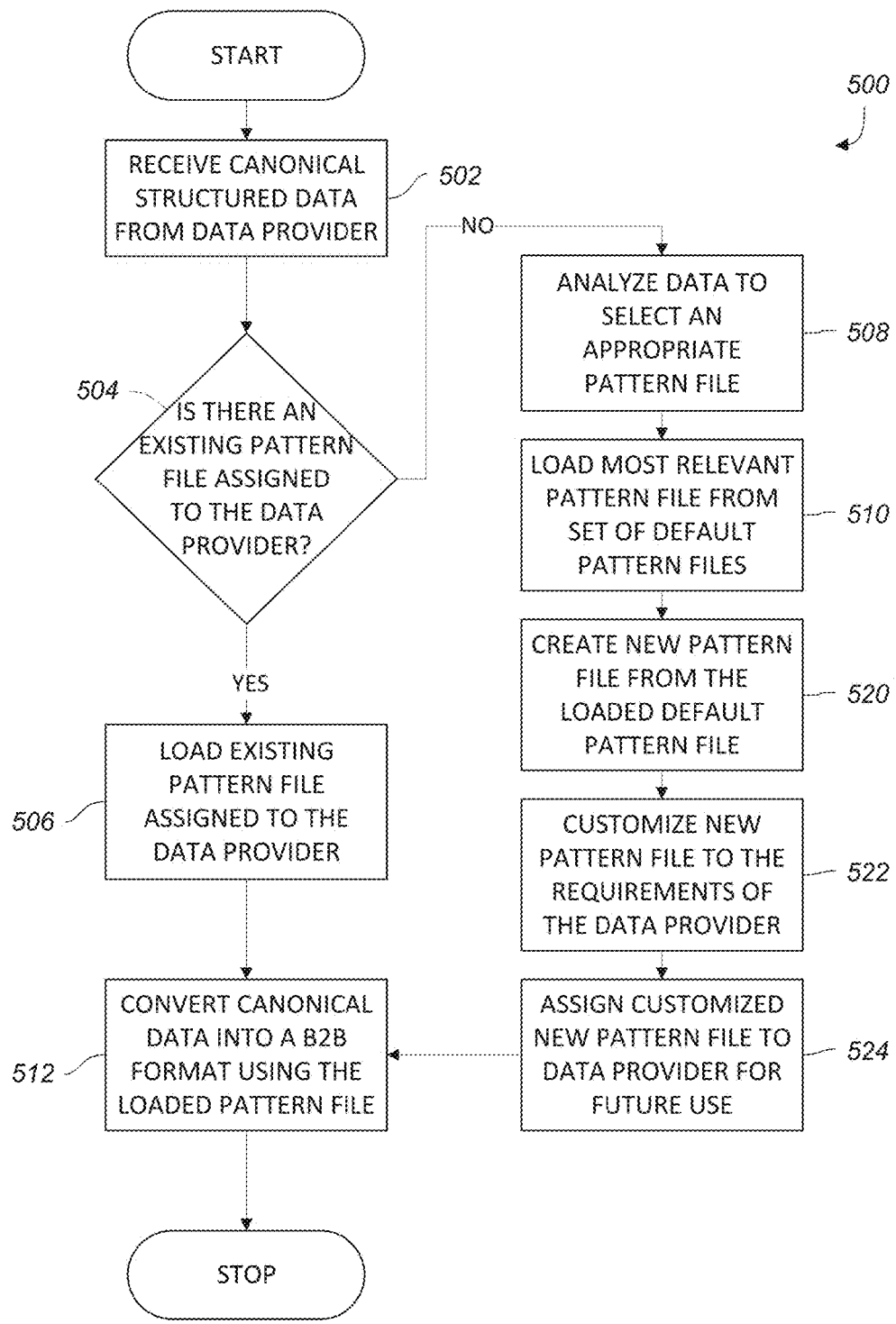
FIG. 5 is a flowchart of a second method that is performed by the system shown in FIG. 3 of the steps for converting canonical formatted data to a B2B format.

Turning attention to FIG. 5, an example of a method for converting canonical formatted data to B2B standard structured data, method 500, will now be described. Method 500 is essentially method 400 run in reverse, and accordingly includes many similar or identical features to method 400. Thus, for the sake of brevity, each feature of method 400 will not be redundantly explained. Rather, key distinctions between method 500 and method 400 will be described in detail and the reader should reference the discussion above for features substantially similar between the two methods.

As can be seen in FIG. 5, method 500 includes a step 502 of receiving by a translation engine 304 of canonical structured data 308 from a data provider. In step 506, translation engine 304 loads a pattern file 306 corresponding to a target recipient of data 302. The pattern file 306 includes instructions for translating the canonical structured data (canonical formatted data) 308 into at least one business to business data standard, which is used in step 512 to convert the canonical structured data 308 into the at least one business to business data standard structure.

In step 502, differing from step 402, the data provider is different from data provider 301, as it is the target recipient of data 302, who receives data in a canonical format, that is providing canonical structured data 308.

Similar to method 400, method 500 turns on a step 504 where the existence of a pattern file 306 that is assigned to a data provider 301, in this case the target that will receive B2B formatted data 302, is determined. If one exists, it is loaded in step 506, following which translation of canonical structured data 308 proceeds in step 512. Likewise, if no pattern file 306 found assigned to data provider 301, steps 508, 510, 520, 522, and 524, each of which correspond with steps 408, 410, 420, 422 and 424 of method 400 in functionality.

Finally, step 512 essentially is the reverse of step 412. Instead of taking B2B formatted data 302 and converting it to a canonical format, canonical structured data 308 is mapped back to B2B formatted data 302 corresponding to data provider 301. The methods of converting used by translation engine 304 are preferably identical to those used to convert the B2B formatted data 302 into canonical formatted data 308, except that they are performed in reverse. Pattern file 306 is arranged as a map to allow such bidirectional translation.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, nether requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method, comprising:
   receiving, from a device, business to business (B2B) data formatted in a B2B data structure;
   determining, by a processing device, a pattern of the B2B data structure;
   querying, by the processing device, a database of defined data patterns to determine whether the pattern of the B2B data structure matches one of the defined data patterns;
   in response to the pattern of the B2B data structure matching one of the defined data patterns in the database,
      translating the B2B data into a canonical format using the matching pattern file;
   in response to the pattern of the B2B data structure not matching any of the defined data patterns in the database:
      identifying a defined data pattern from the database of the defined data patterns that most closely matches the pattern of the B2B data structure;
      generating a new data pattern from the defined data pattern, wherein the new data pattern is customized to a requirement of a data provider associated with the device;
      associating the new data pattern with subsequent B2B data received from the device or other devices associated with the data provider; and
      translating the B2B data into the canonical format using the new data pattern.

2. The method of claim 1, wherein querying the database of the defined data patterns to determine whether the pattern of the B2B data structure matches one of the defined data patterns further comprises:
   determining whether there is an existing data pattern assigned to the data provider, and
   loading the existing data pattern assigned to the data provider.

3. The method of claim 2, wherein the defined data patterns that most closely matches the pattern of the B2B data structure is a default data pattern.

4. The method of claim 3, wherein the default data pattern is loaded from a set of one or more default data pattern, where the set of one or more default data patterns is assigned to a specific industry type.

5. The method of claim 3, wherein the default data pattern comprises a generic data pattern.

6. The method of claim 1, wherein customizing the new data pattern comprises conforming the new data pattern to a translation requirement of the data provider.

7. The method of claim 1, further comprising converting, by a canonical conversion program, the B2B data in the canonical format into a target format.

8. A method, comprising:
   receiving, from a device, data;
   determining, by a processing device, a pattern of the data;
   query, by the processing device, a database of defined data patterns to determine whether the pattern of the data matches one of the defined data patterns;
   in response to the pattern of the data matching one of the defined data patterns in the database, translating a structure of the data into a business to business (B2B) data standard using the matching defined data pattern; and
   in response to the pattern of the data not matching at least one of the defined data patterns in the database:
      generate a new data pattern using one of the data patterns in the database that most closely matches the pattern of the B2B data;
      associate the new data pattern with subsequent data received from the device or other devices associated with a provider of the subsequent data; and
      translating the B2B data into a canonical format using the new data pattern.

9. The method of claim 8, further comprising
   receiving a canonical data format file from the provider; and
   translating the B2B data using the canonical data format file.

10. The method of claim 8, wherein determining whether the pattern of the data structure matches one of the defined data patterns further comprises determining whether the database stores a default pattern for the provider.

11. The method of claim 10, further comprising
    customizing the new data pattern to conform to a translation requirement of a target data recipient.

12. A system, comprising:
    a database configured to store one or more B2B data patterns;
    a processing device configured to:
       receive business to business (B2B) data from another device; and
       determine a pattern of the B2B data; and
       query the database of B2B data patterns to determine whether the pattern of the B2B data matches one of the B2B data patterns;

in response to the pattern of the B2B data matching a B2B data pattern stored in the database, translate the B2B data into a canonical format using the matching data pattern; and in response to the pattern of the B2B data not matching any of the data patterns in the database:
- identify a defined data pattern from the database of the defined data patterns that most closely matches the pattern of the B2B data;
- generate a new data pattern from the defined data pattern, wherein the new data pattern;
- associate the new data pattern with B2B data received from the device or other devices associated with a data provider; and
- translating the B2B data into the canonical format using the new data pattern.

13. The system of claim 12, wherein the matching B2B data pattern stored in the database is a B2B data pattern that is assigned to the data provider.

14. The system of claim 12, further comprising a canonical conversion program executing on the processing device, wherein the canonical conversion program converts the B2B data from the canonical format into a target format.

15. The system of claim 12, wherein the one or more B2B data patterns stored in the database are default data patterns.

16. The system of claim 15, wherein the default data patterns further comprise a set of one or more industry default pattern files, where the one or more industry default pattern files is assigned to a specific industry type.

17. The system of claim 15, wherein the default data pattern is a standard business to business data pattern.

18. The system of claim 12, wherein the processing device is configure to
customizing the new data pattern to conform to a translation requirement of the data provider.

* * * * *